US011964555B2

(12) United States Patent
Kirita et al.

(10) Patent No.: US 11,964,555 B2
(45) Date of Patent: Apr. 23, 2024

(54) WORK VEHICLE

(71) Applicant: Hitachi Construction Machinery Co., Ltd., Tokyo (JP)

(72) Inventors: Katsuyuki Kirita, Higashine (JP); Masamichi Tanaka, Higashine (JP); Yuuto Abe, Higashine (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 563 days.

(21) Appl. No.: 17/271,324

(22) PCT Filed: Aug. 5, 2019

(86) PCT No.: PCT/JP2019/030756
§ 371 (c)(1),
(2) Date: Feb. 25, 2021

(87) PCT Pub. No.: WO2020/059334
PCT Pub. Date: Mar. 26, 2020

(65) Prior Publication Data
US 2021/0252970 A1 Aug. 19, 2021

(30) Foreign Application Priority Data

Sep. 21, 2018 (JP) .................................. 2018-177258

(51) Int. Cl.
*B60K 15/00* (2006.01)
*B60K 15/04* (2006.01)
(Continued)

(52) U.S. Cl.
CPC ............ *B60K 15/063* (2013.01); *B60K 15/04* (2013.01); *B60K 2015/03118* (2013.01); *B60K 2015/03217* (2013.01); *E01C 19/282* (2013.01)

(58) Field of Classification Search
CPC ...... B60K 15/063; B60K 15/04; B60K 15/01; B60K 2015/03118; B60K 2315/03217
(Continued)

(56) References Cited

U.S. PATENT DOCUMENTS

| 4,930,537 A * | 6/1990 | Farmer | .............. F02M 37/0047 123/514 |
| 5,738,380 A * | 4/1998 | Zipser | .................... B60K 15/03 280/834 |

(Continued)

FOREIGN PATENT DOCUMENTS

| JP | 2003-227742 A | 8/2003 |
| JP | 2009-79555 A | 4/2009 |

(Continued)

OTHER PUBLICATIONS

International Search Report (PCT/ISA/210) issued in PCT Application No. PCT/JP2019/030756 dated Oct. 15, 2019 with English translation (five (5) pages).
(Continued)

*Primary Examiner* — Hau V Phan
(74) *Attorney, Agent, or Firm* — Crowell & Moring LLP

(57) ABSTRACT

A work vehicle including a drive device (10) having an internal combustion engine (12) for driving a vehicle body (1) has: a first tank (32) that is disposed in front of or behind the drive device, and stores fuel (9) to be supplied to the internal combustion engine; a second tank (34) that is disposed below the drive device so as to be separated from the first tank by a predetermined distance, and stores the fuel to be supplied to the internal combustion engine; a first storage amount detection part (70) that is disposed in the first tank, and detects an amount of the fuel stored in the first tank; and a second storage amount detection part (80) that is (Continued)

disposed in the second tank, and detects an amount of the fuel stored in the second tank.

4 Claims, 8 Drawing Sheets

(51) Int. Cl.
*B60K 15/063* (2006.01)
*B60K 15/03* (2006.01)
*E01C 19/28* (2006.01)

(58) Field of Classification Search
USPC ........................................................ 180/69.4
See application file for complete search history.

(56) References Cited

U.S. PATENT DOCUMENTS

| | | | | |
|---|---|---|---|---|
| 6,382,982 | B1* | 5/2002 | Wilcox | G09B 23/22 434/303 |
| 6,508,265 | B1* | 1/2003 | Bertouille | B60K 15/077 123/514 |
| 6,792,966 | B2* | 9/2004 | Harvey | F02D 33/003 123/514 |
| 8,333,177 | B2* | 12/2012 | Kuhn | B60K 15/01 123/495 |
| 8,579,332 | B2* | 11/2013 | Sonderegger | F02M 37/0023 123/514 |
| 10,828,982 | B2* | 11/2020 | Mills | B60K 15/03519 |
| 2014/0107906 | A1* | 4/2014 | Jentz | F02M 37/0088 180/65.21 |
| 2016/0341141 | A1* | 11/2016 | Dudar | F02D 41/22 |
| 2018/0029468 | A1* | 2/2018 | Mills | B60K 15/035 |

FOREIGN PATENT DOCUMENTS

| | | |
|---|---|---|
| JP | 2012-173043 A | 9/2012 |
| JP | 2017-133560 A | 8/2017 |
| JP | 2017-136875 A | 8/2017 |
| JP | 2018-19625 A | 2/2018 |

OTHER PUBLICATIONS

Japanese-language Written Opinion (PCT/ISA/237) issued in PCT Application No. PCT/JP2019/030756 dated Oct. 15, 2019 (three (3) pages).

* cited by examiner

WORK VEHICLE

TECHNICAL FIELD

The present invention relates to a work vehicle, and particularly to a technology of detecting a fuel amount stored in a fuel tank.

BACKGROUND ART

Generally, in road pavement work, a so-called earthwork vibration roller is used in order to equalize flatness of the ground before construction of asphalt.

This earthwork vibration roller is equipped with an engine and a fuel tank, and the engine operates by burning fuel supplied from the fuel tank.

Since work vehicles such as earthwork vibration rollers and hydraulic excavators are used for road pavement work, an environment for replenishing fuel such as gas stations may be located away from a work site.

Therefore, it is conceivable to make the fuel tank as large as possible in order to increase the amount of fuel that can be stored in the fuel tank.

However, when the fuel tank is thus enlarged, it may be difficult for one liquid level gauge to accurately detect the amount of fuel stored in the fuel tank.

Therefore, for a rectangular box-shaped fuel tank that extends vertically, a technology of accurately detecting the amount of fuel stored in the fuel tank by arranging a plurality of liquid level gauges vertically and detecting detection of a liquid level has been developed (Patent Document 1).

PRIOR ART DOCUMENT

Patent Document

Patent Document 1: Japanese Patent Laid-Open No. 2012-173043

SUMMARY OF THE INVENTION

Problems to be Solved by the Invention

The earthwork vibration roller has certain restrictions on its shape and size from the viewpoint of visibility and workability by an operator during work. Therefore, in order to mount the engine and the fuel tank without degrading a function and performance (capacity), it is necessary to devise the shape of a device with a higher degree of freedom in shape than the engine, such as the fuel tank. The fuel tank particularly has a high degree of freedom in molding and tends to have a complicated shape.

In view of the technology disclosed in the aforementioned Patent Document 1, since the shape of the fuel tank is a rectangular box-shape extending vertically, the amount of fuel stored in the fuel tank can be detected accurately. In a fuel tank formed in a complicated shape, there is a problem that the detection accuracy cannot be kept good.

The present invention has been made in view of such a problem, and an object of the present invention is to provide a work vehicle mounted with a fuel tank on a vehicle body without reducing an amount of fuel that can be stored in the fuel tank, and capable of accurately detecting an amount of fuel stored in the fuel tank.

Means for Solving the Problems

In order to achieve the above object, according to a work vehicle of the present invention, a work vehicle including a drive device having an internal combustion engine for driving a vehicle body has: a first tank that is disposed in front of or behind the drive device, and stores fuel to be supplied to the internal combustion engine; a second tank that is disposed below the drive device so as to be separated from the first tank by a predetermined distance, and stores fuel to be supplied to the internal combustion engine; a first storage amount detection part that is disposed in the first tank, and detects an amount of the fuel stored in the first tank; and a second storage amount detection part that is disposed in the second tank, and detects an amount of the fuel stored in the second tank.

Advantageous Effects of the Invention

According to a work vehicle of the present invention, it is possible to mount a fuel tank on a vehicle body without reducing an amount of fuel that can be stored in the fuel tank, and accurately detect an amount of fuel stored in the fuel tank.

MODE FOR CARRYING OUT THE INVENTION

Hereinafter, a first embodiment of the present invention will be described with reference to the drawings.

Figure 1:
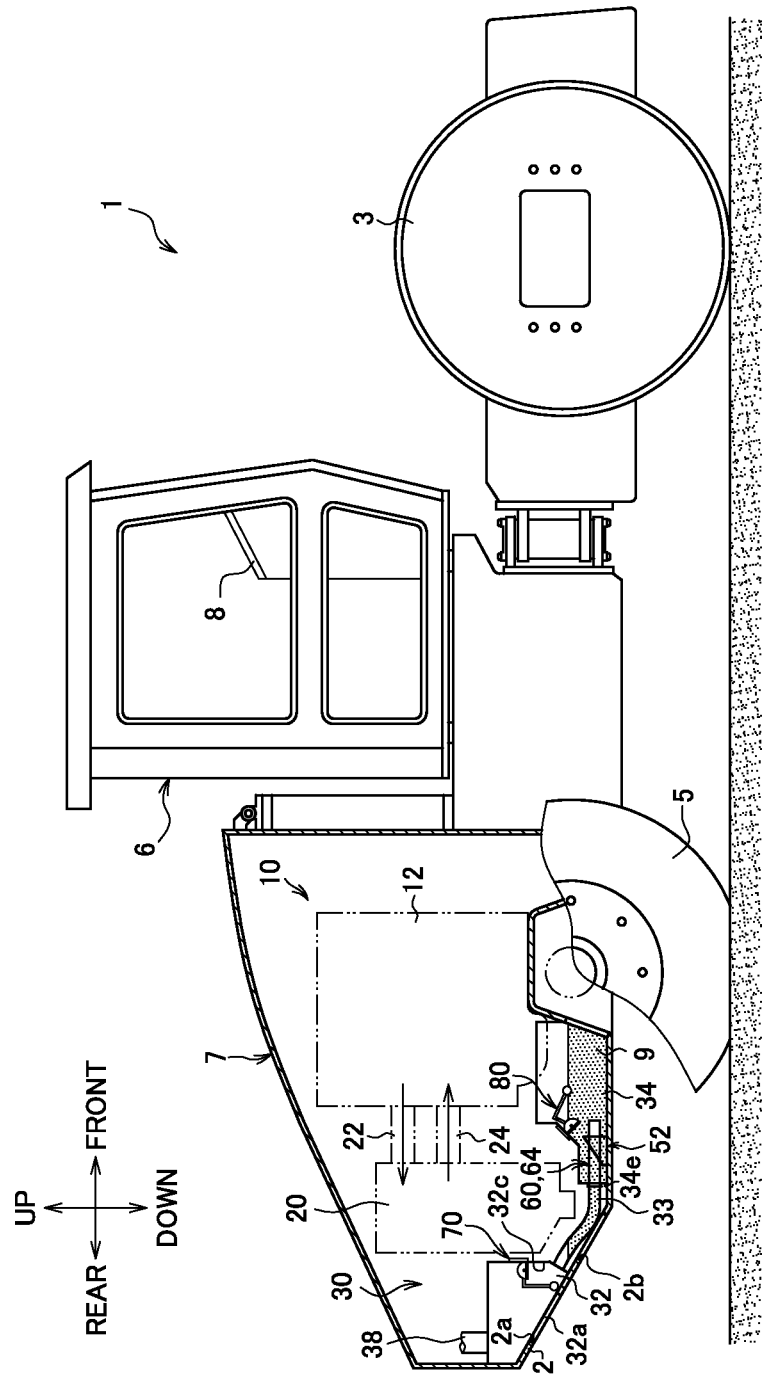
FIG. 1 is a schematic configuration diagram of a vehicle body mounted with a fuel tank unit.

Referring to FIG. 1, a schematic configuration diagram of a vehicle body 1 of a work vehicle is illustrated. The vehicle body 1 is a so-called earthwork vibration roller having front wheels 3 which are iron wheels, and capable of compacting the ground before construction of asphalt by vibrating the front wheels 3 by an eccentric weight (not illustrated) provided in the front wheels 3 while moving forward and rearward the vehicle body 1 by driving rubber rear wheels 5, for example. This vehicle body 1 is mounted with an operator's seat 6, a drive device 10 and a fuel tank unit 30.

An operator's seat 6 is a seat which is disposed at the center in the front-rear direction of a vehicle body 1, and on which an operator who operates the vehicle body 1 boards. In the operator's seat 6, devices used for operation of the vehicle body 1, such as an operation panel 8 and an operation lever (not illustrated), are disposed.

The drive device 10 includes an engine (internal combustion engine) 12 and a cooling device 20. The engine 12 is an internal combustion engine that burns fuel 9 supplied from the fuel tank unit 30 to generate driving force, and is mounted on the front side with respect to the center of an engine room 7 provided in a rear part in the front-rear direction of the vehicle body 1. That is, the drive device 10 can move forward and rearward the vehicle body 1 by driving the front wheels 3 and the rear wheels 5 by using the driving force operated and generated by the engine 12. The cooling device 20 is a so-called heat exchanger provided on the rear side in the front-rear direction of vehicle body 1 with respect to the engine 12.

The cooling device 20 is connected to the engine 12 by a high-temperature pipe 22 and a low-temperature pipe 24 so as to enable cooling water to flow. More specifically, cooling water that flows through a water jacket (not illustrated) provided in the engine 12 is heated by heat generated by operation of the engine 12, and the high-temperature cooling water flows through the cooling device 20 through the high-temperature pipe 22. This high-temperature cooling water is cooled by the cooling device 20 to flows through the engine 12 through the low-temperature pipe 24. Consequently, in the engine 12, excessive rise of the internal temperature is suppressed.

Figure 2:
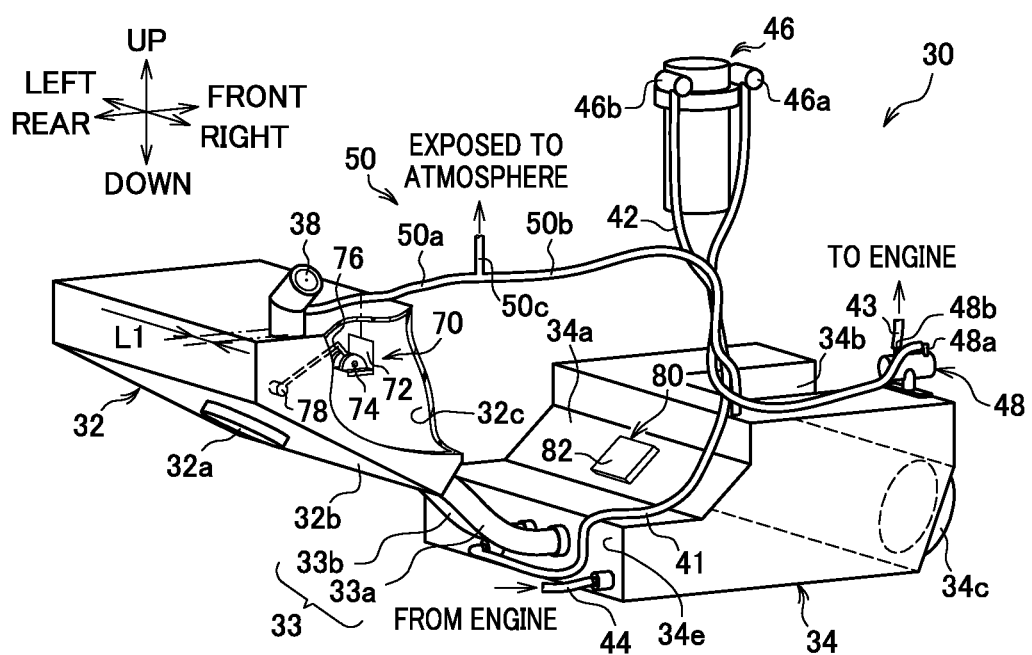
FIG. 2 is a perspective view of a fuel tank unit viewed from the obliquely right rear side of the vehicle body.
Figure 3:
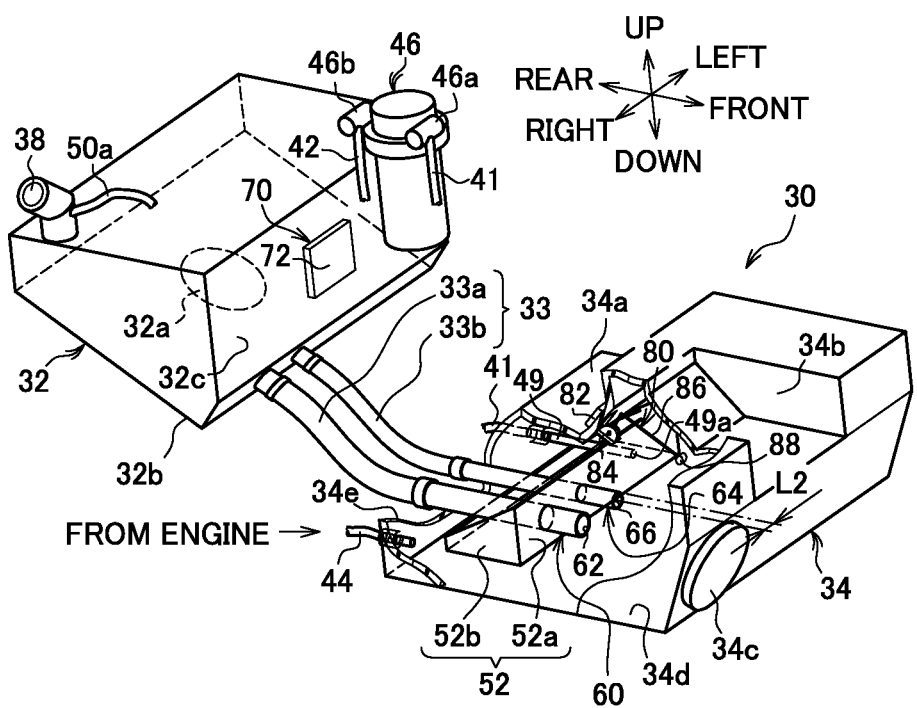
FIG. 3 is a perspective view of the fuel tank unit viewed from the obliquely right front side of the vehicle body.

Referring to FIG. 2, a perspective view of the fuel tank unit 30 viewed from the obliquely right rear side of the vehicle body 1 is illustrated. Referring to FIG. 3, a perspective view of the fuel tank unit 30 viewed from the obliquely right front side of the vehicle body 1 is illustrated.

The fuel tank unit 30 includes a first tank 32, a second tank 34, a piping member 33, a filter device 46, a pump 48, a breather unit 50, a fuel holding member 52, a first tubular member 60 and a second tubular member (second replenishing port) 64.

The first tank 32 is a tank disposed behind the drive device 10, and capable of storing the fuel 9. An oil filling port (first replenishing port) 38 for supplying the fuel 9 to the first tank 32 is provided on the right in the right-left direction of the vehicle body 1 at the upper part of this first tank 32. A lower surface 32b of the first tank 32 is formed in a shape inclined at a predetermined angle so as to lower toward the front direction of the vehicle body 1 from a rear end to a front end.

A first cleaning window 32a is provided in the lower surface 32b of the first tank 32. The first cleaning window 32a is a window for cleaning the first tank 32 when an operator wrongly supplies liquid medicine other than the fuel 9 such as a reducing agent from the oil filling port 38 to the first tank 32, for example, the window being openable from a first opening 2a provided in a lower panel 2 disposed below the first tank 32 and the second tank 34.

The second tank 34 is a tank disposed below the drive device 10 so as to be separated from the first tank 32 by a predetermined distance, and capable of storing the fuel 9. In the second tank 34, a recess 34a for avoiding interference with the cooling device 20 is formed in a rear upper part, and a groove 34b for avoiding interference with the engine 12 is formed at a center in the right-left direction in a front upper part. Furthermore, a second cleaning window 34c is provided in a front end of the second tank 34. This second cleaning window 34c is a window for cleaning the second tank 34 similarly to the first cleaning window 32a.

A first tube 41 and a fourth tube 44 are connected to the second tank 34. The fourth tube 44 has a first end connected to a rear end surface 34e of the second tank 34 so as to be able to supply the fuel 9, and a second end connected to the engine 12. The first tube 41 is connected to a sucking-out part 49 described below, and has a second end connected to the filter device 46 so as to enable the fuel 9 to flow.

The filter device 46 is a filter capable of purifying the fuel 9 by removing fine dust or the like included in the fuel 9. In the filter device 46, the second end of the first tube 41 is connected to an introduction part 46a so as to enable the fuel 9 to flow, and a first end of a second tube 42 is connected to a discharge part 46b as to enable the fuel 9 to flow.

The second tube 42 has the first end connected to the discharge part 46b of the filter device 46 so as to enable the fuel 9 to flow, and a second end connected to an introduction part 48a of the pump 48 so as to enable the fuel 9 to flow. The pump 48 is, for example, a trochoid type pump, sucks the fuel 9 from the second tube 42 through the introduction part 48a, and discharges the fuel 9 to a third tube 43 having a first end connected so as to enable the fuel 9 to flow from a discharge part 48b.

The third tube 43 has the first end connected to the discharge part 48b of the pump 48 so as to enable the fuel 9 to flow, and a second end connected to the engine 12 so as to enable the fuel 9 to flow. Thus, the fuel 9 stored in the second tank 34 is introduced in the filter device 46 through the first tube 41 to be purified, and thereafter is sucked in the pump 48 through the second tube 42, and is supplied to the engine 12 through the third tube 43.

The engine 12 operates by burning the fuel 9 supplied as described above. At this time, the fuel 9 that is not used for combustion and remains, out of the fuel 9 supplied to the engine 12, returns to the second tank 34 through the fourth tube 44.

The first tube 41 is connected so as to be able to supply the fuel 9 to the sucking-out part 49 provided to penetrate the rear end surface 34e of the second tank 34. This sucking-out part 49 is a hollow tubular member extending to the front side of the vehicle body 1 from the rear end surface 34e, in other words, in the direction away from the first tank 32, and is provided with an opening 49a at an end on the front side.

The first tank 32 and the second tank 34 are connected through the piping member 33 so as to enable the fuel 9 to flow. The piping member 33 includes a first pipe 33a and second pipes 33b. The first pipe 33a is a flexible pipe having a first end connected to the first tank 32 so as to enable the fuel 9 to flow, and a second end connected to the second tank 34 so as to enable the fuel 9 to flow.

Each of the second pipes 33b is a flexible pipe that has a first end connected to the first tank 32 so as to enable the fuel 9 to flow, and a second end connected to the second tank 34 so as to enable the fuel 9 to flow, and that is thinner than the first pipe 33a. The second pipes 33b are disposed at positions further separated from the oil filling port 38 than the first pipe 33a.

In other words, the first pipe 33a has a larger inner diameter than the second pipes 33b, and therefore a circulation possible amount of the fuel 9 per predetermined time can be increased compared to the second pipes 33b. Consequently, the first pipe 33a is closer to the oil filling port 38 than the second pipes 33b, and therefore the fuel 9 replenished from the oil filling port 38 can be satisfactorily replenished to the second tank 34.

The fuel holding member 52 is composed of a front wall 52a and side walls 52b. The front wall 52a is formed so as to extend upward from a bottom 34d of the second tank 34 such that an upper end is disposed above the opening 49a of the sucking-out part 49.

Like the front wall 52a, the side walls 52b are formed so as to extend upward from the bottom 34d of the second tank 34, have upper ends inclined on the side of the bottom 34d from the upper end of the front wall 52a to the rear in the vehicle body front-rear direction, and are disposed at two locations on right and left ends of the front wall 52a. That is, the front wall 52a and the side walls 52b are disposed so as to surround the front side and the left and right sides of the opening 49a.

The first tubular member 60 is provided such that a first end is opened in the rear end surface 34e so as to allow the fuel 9 to flow along with the first pipe 33a and of the piping member 33. The first tubular member 60 is a hollow tubular member having a second end extending in a direction away from the first tank and penetrating the front wall 52a of the fuel holding member 52. At a second end of the first tubular member 60, an opening 62 is provided in the second tank 34 so as to allow the fuel 9 to flow. The opening 62 is provided at a position separated from the first tank 32 with respect to the opening 49a of the sucking-out part 49.

Like the first tubular member 60, the second tubular member 64 is provided such that a first end is opened in the rear end surface 34e so as to allow the fuel 9 to flow from the second pipe 33b of the piping member 33. The second tubular member 64 is a hollow tubular member having a second end extending in a direction away from the first tank 32, penetrating the front wall 52a of the fuel holding member 52, and having a smaller diameter than the first tubular member 60.

At the second end of the second tubular member 64, an opening 66 is provided in the second tank 34 so as to allow the fuel 9 to flow. This opening 66 is provided at a position separated from the first tank 32 with respect to the opening 49a of the sucking-out part 49. The second tubular member 64 is disposed on the left side of the vehicle body 1 in the direction away from the oil filling port 38 from the first tubular member 60.

In other words, the first tubular member 60 has a larger inner diameter than the second tubular member 64, and therefore an amount of the fuel 9 that can flow per predetermined time can be made larger than that of the second tubular member 64. Further, the first tubular member 60 is closer to the oil filling port 38 than the second tubular member 64, and therefore the fuel 9 replenished from the oil filling port 38 can be satisfactorily replenished to the second tank 34.

Figure 4:
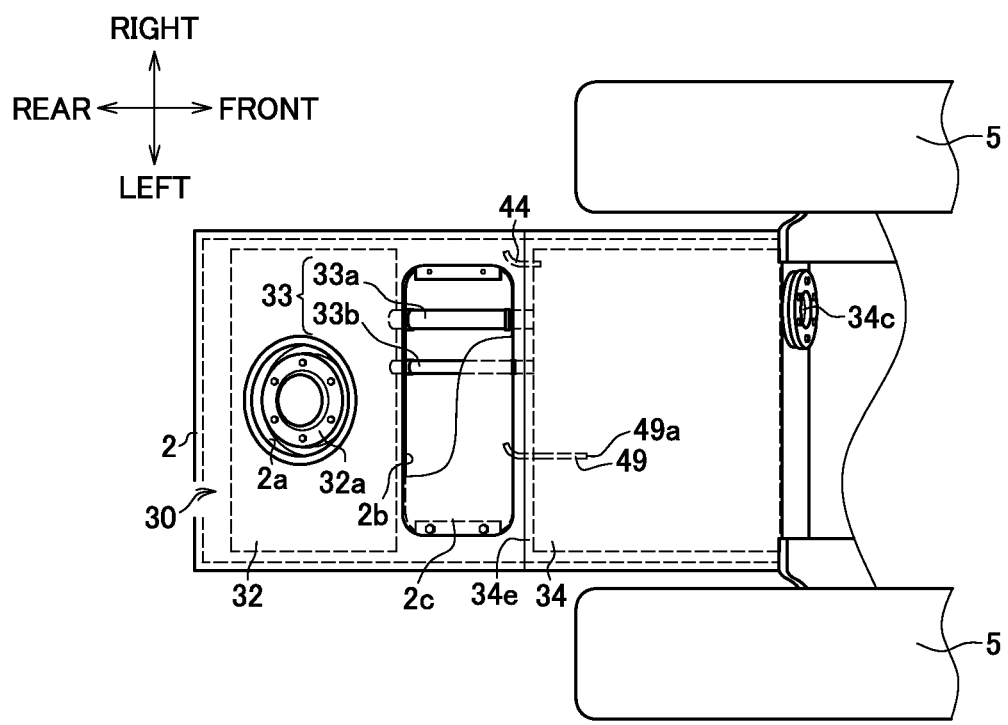
FIG. 4 is a bottom view of a vehicle body rear part according to the present embodiment.

Referring to FIG. 4, a bottom view of a rear part of the vehicle body 1 is illustrated. A second opening 2b is provided at a position corresponding a portion between the first tank 32 and the second tank 34 in the lower panel 2. Consequently, an operator can perform maintenance of the cooling device 20 in the drive device 10 from below the vehicle body 1.

A protective plate 2c is a plate member formed in a shape corresponding to an inner peripheral edge of the second opening 2b. This protective plate 2c is detachably mounted on the lower panel 2 by, for example, bolts so as to close the second opening 2b. That is, in other cases except maintenance or the like, in the lower panel 2, the second opening 2b is closed by the protective plate 2c. The protective plate 2c is detachably mounted, so that an operator can detach the protective plate 2c from the lower panel 2 to perform maintenance of a lower part of the drive device 10 from below the vehicle body 1.

Returning to FIG. 2, the breather unit 50 is connected to the first tank 32 and the second tank 34. The breather unit 50 includes a first breather hose 50a, a second breather hose 50b, and a third breather hose 50c. The first breather hose 50a has a first end connected to the oil filling port 38 provided in an upper part of the first tank 32 so as to enable ventilation, and has a second end connected to a lower end of the third breather hose 50c so as to enable ventilation.

The second breather hose 50b has a first end connected to an upper end of the second tank 34 so as to enable ventilation, and a second end connected to the lower end of the third breather hose 50c so as to enable ventilation. The third breather hose 50c has the lower end connected to the first breather hose 50a and the second breather hose 50b so as to enable ventilation, and an upper end connected to a canister (not illustrated) so as to enable ventilation.

Pressure is sometimes generated in the upper part of the first tank 32 and an upper part of the second tank 34 by volatilization of the stored fuel 9. That is, the canister is connected to the upper end of the third breather hose 50c, so that the pressure generated in each of the upper parts of the first tank 32 and the second tank 34 can be opened to the atmosphere after the volatilized fuel 9 is extracted.

In the breather unit 50, the second end of the first breather hose 50a and the second end of the second breather hose 50b are connected to each other so as to enable ventilation. That is, the first breather hose 50a and the second breather hose 50b are connected to each other so as to enable ventilation, so that the breather unit 50 can lower the pressure while uniformizing the pressure generated in the first tank 32 and the pressure generated in the second tank 34. Therefore, when the fuel 9 flows through the first tank 32 and the second tank 34, for example, when the vehicle body 1 inclines such that the front part of the vehicle body 1 lowers and rises, the atmospheric pressure in the first tank 32 and the atmospheric pressure in the second tank 34 are uniformized, so that the fuel 9 can satisfactorily flow.

Figure 5:
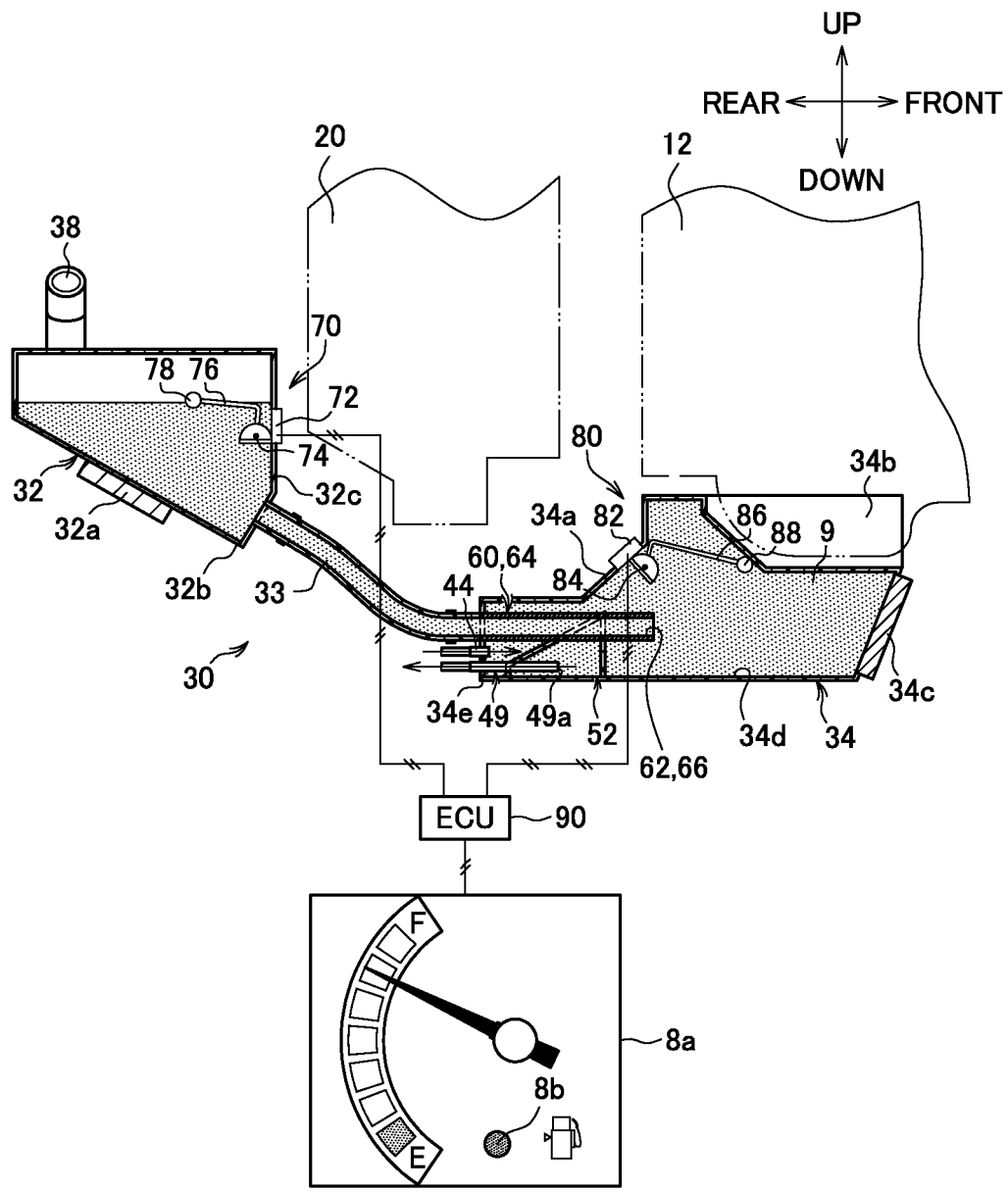
FIG. 5 is an explanatory diagram illustrating a state of fuel when the vehicle body is located on a flat ground.
Figure 6:
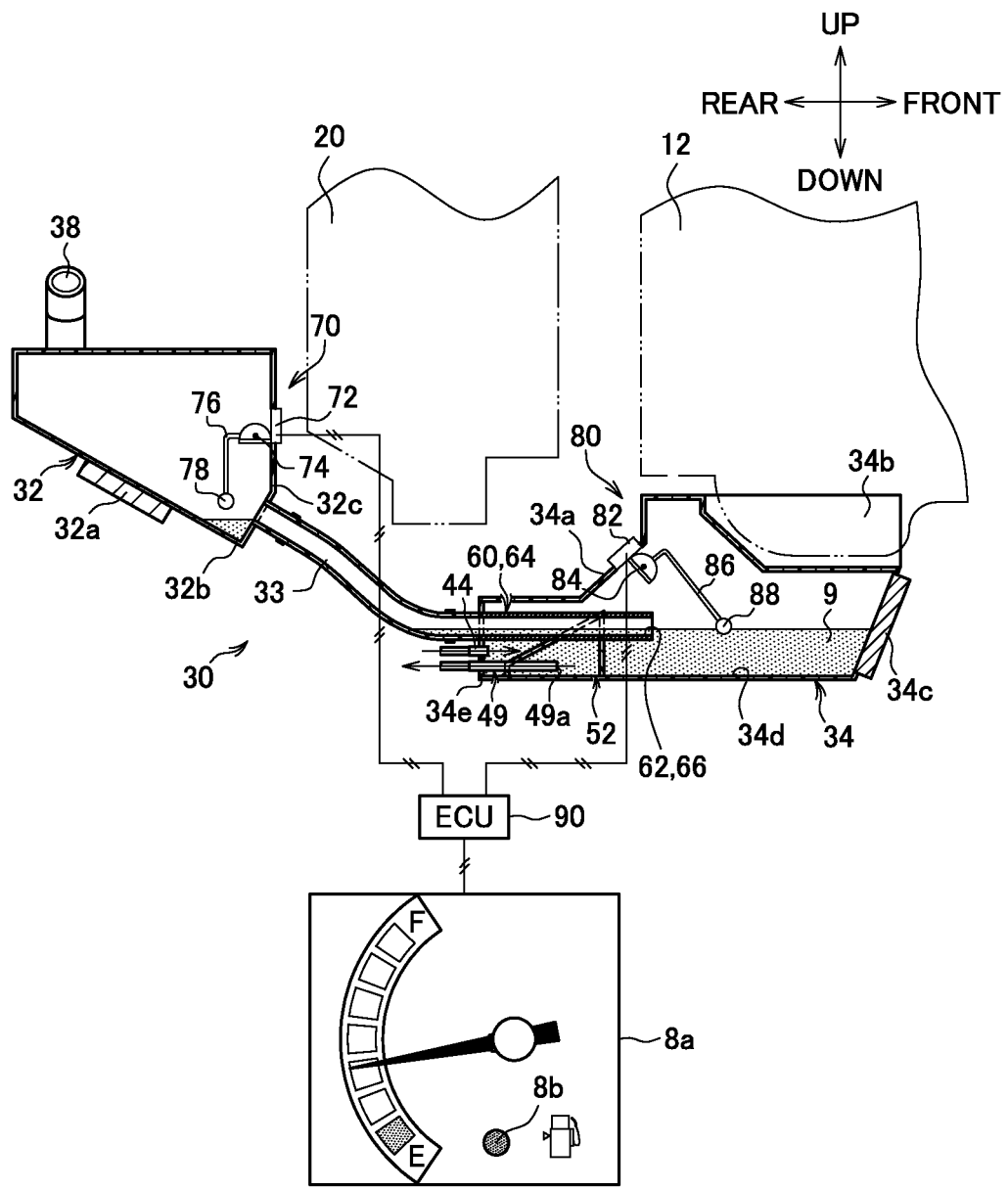
FIG. 6 is an explanatory diagram illustrating a state of fuel when the vehicle body is located on the flat ground.

With reference to FIGS. 5 and 6, an explanatory diagram illustrating a state of the fuel 9 when the vehicle body 1 is located on a flat ground is illustrated. A first float sensor (first storage amount detection part) 70 is disposed in the first tank 32. Further, a second float sensor (second storage amount detection part) 80 is disposed in the second tank 34. The first float sensor 70 and the second float sensor 80 are provided with detection devices 72, 82, rotating shafts 74, 84, arms 76, 86 and floats 78, 88, respectively.

The detection device 72 is a detection device mounted at a vehicle body right-left direction center of a rear surface 32c of the first tank 32, in other words, a position separated from the oil filling port 38 toward the left in the vehicle body right-left direction by at least a first distance L1. Herein, the first distance L1 is a distance at which the fuel 9 can flow from the oil filling port 38 toward the left in the vehicle body right-left direction when the fuel 9 is supplied from the oil filling port 38 to the first tank 32. This detection device 72 can detect the storage amount of the fuel in the first tank 32 from the degree of rotation of the arm 76, which will be described later. The rotating shaft 74 is a shaft provided in the detection device 72, mounted with the first end of the arm 76, and extending in the vehicle body right-left direction.

The arm 76 is a rod-shaped member having a first end mounted on the rotating shaft 74 so as to be rotatable in the vehicle body vertical direction and having a second end extending toward the inside of the first tank 32. The float 78 having buoyancy with respect to the fuel 9 is mounted on the second end of the arm 76. The float 78 is disposed on the second end of the arm 76 at such a position as to vertically rotate on a right-left direction substantial center and on a front-rear direction substantial center of the first tank 32. Specifically, the arm 76 and the float 78 are each disposed such that a locus of the float 78 by rotation of the arm 76 includes the vehicle body front-rear direction center of the first tank 32 at the right-left direction center of the first tank 32. The position where the float 78 is disposed is, for example, a position separated by at least the first distance L1 in the vehicle body right-left direction from the path for allowing the fuel 9 replenished from the oil filling port 38 to flow into the first tank 32.

With such a configuration, in the first float sensor 70, the float 78 floats on the liquid surface of the fuel 9 by buoyancy, and therefore the arm 76 can be rotated around the rotating shaft 74 by using the buoyancy, and the detection device 72 can detect the storage amount of the fuel 9 in the first tank 32 from the degree of the rotation of the arm 76.

The float 78 is disposed at such a position as to vertically rotate on the right-left direction substantial center and on the front-rear direction substantial center of the first tank 32, so that the storage amount of the fuel 9 can be exactly detected even in a case where the vehicle body 1 is inclined. Furthermore, the detection device 72 is located at a position separated from the oil filling port 38 by at least the first distance L1, so that the arm 76 and the float 78 are also located at a position separated from the oil filling port 38 by at least the first distance L1, and therefore it is possible to prevent the fuel 9 supplied from the oil filling port 38 from directly falling on the arm 76 and the float 78.

The detection device 82 is a detection device mounted at a vehicle body right-left direction center of a recess 34a of the second tank 34, in other words, a position separated from the second tubular member 64 toward the left in the vehicle body right-left direction by at least a second distance L2. Herein, the second distance L2 is a distance at which the fuel 9 can flow from the second tubular member 64 toward the left in the vehicle body right-left direction when the fuel 9 is supplied from the second tubular member 64 to the second tank 34. The detection device 82 can detect the storage amount of the fuel in the second tank 34 from the degree of rotation of the arm 86, which will be described later. The rotating shaft 84 is a shaft provided on the detection device 82, mounted with the first end of the arm 86, and extending in the vehicle body right-left direction.

The arm 86 is a rod-shaped member having a first end mounted on the rotating shaft 84 so as to be rotatable in the vehicle body vertical direction and having a second end extending toward the inside of the second tank 34. The float 88 having buoyancy with respect to the fuel 9 is mounted on the second end of the arm 86. The float 88 is disposed on the second end of the arm 86 at such a position as to vertically rotate on a right-left direction substantial center and on a front-rear direction substantial center of the second tank 34. Specifically, the arm 86 and the float 88 are each disposed such that a locus of the float 88 by rotation of the arm 86 includes the vehicle body front-rear direction center of the second tank 34 on the right-left direction center of the second tank 34. The position where the float 88 is disposed is, for example, a position separated by at least the second distance L2 in the vehicle body right-left direction from the path for allowing the fuel 9 replenished from the second tubular member 64 to flow into the second tank 34.

With such a configuration, in the second float sensor 80, the float 88 floats on the liquid surface of the fuel 9 by buoyancy, and therefore the arm 86 can be rotated around the rotating shaft 84 by using the buoyancy, and the detection device 82 can detect the storage amount of the fuel 9 in the second tank 34 from the degree of the rotation of the arm 86.

The float 88 is disposed at such a position as to vertically rotate on the right-left direction substantial center and on the front-rear direction substantial center of the second tank 34, so that the storage amount of the fuel 9 can be exactly detected even in a case where the vehicle body 1 is inclined. Furthermore, the detection device 82 is located at a position separated from the second tubular member 64 by at least the second distance L2, so that the arm 86 and the float 88 are also located at a position separated from the second tubular member 64 by at least the second distance L2, and therefore it is possible to prevent the fuel 9 supplied from the second tubular member 64 from directly falling on the arm 86 and the float 88.

An ECU 90 is a control device for performing comprehensive control including operation control of the engine 12, and includes an input/output device, a storage device (ROM, RAM, non-volatile RAM, etc.), a central processing unit (CPU), and the like.

The detection device 72 of the first float sensor 70 and the detection device 82 of the second float sensor 80 are electrically connected to the input side of the ECU 90, and the storage amount of the fuel 9 in each of the first tank 32 and the second tank 34 is input to the input side. The operation panel 8 of the operator's seat 6 is electrically connected to the output side of the ECU 90, and the storage amount of the fuel 9 (total storage amount S described later) in the fuel tank unit 30 can be displayed on a fuel meter 8a, and the warning light 8b can be turned on and flashed.

Hereinafter, a supply method and a flow state of the fuel 9 will be described below.

When the fuel 9 is supplied from the oil filling port 38 to the first tank 32 of the fuel tank unit 30, the fuel 9 is supplied to the second tank 34 via the piping member 33, the first tubular member 60 and the second tubular member 64.

Specifically, the fuel 9 supplied to the first tank 32 flows downward along the lower surface 32b due to gravity, passes through the piping member 33, and reaches the rear end surface 34e. The first tubular member 60 and the second tubular member 64 are provided in the rear end surface 34e so as to allow the fuel 9 to flow, and therefore the fuel 9 passes through the first tubular member 60 and the second tubular member 64 and is supplied to the second tank 34.

Figure 7:
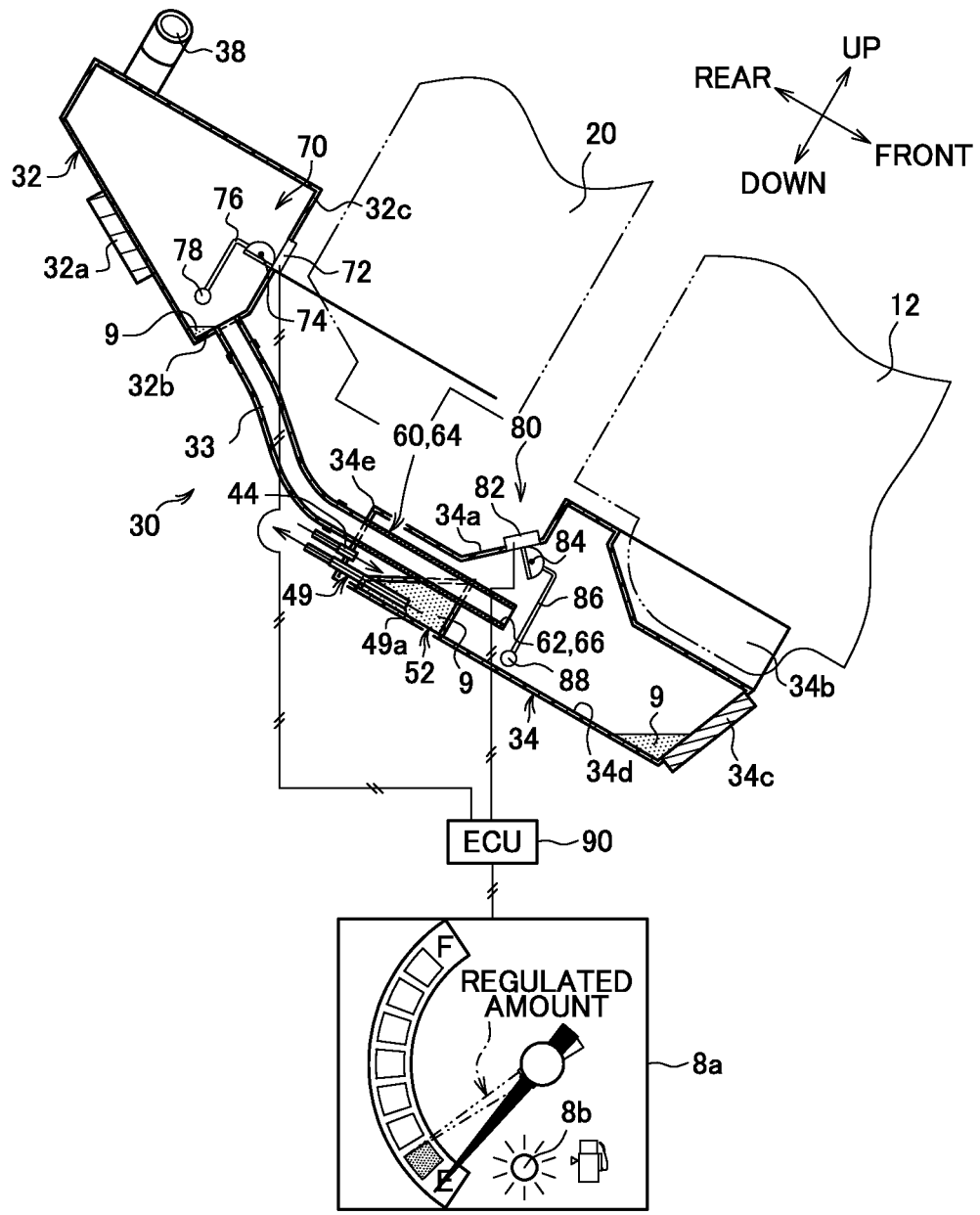
FIG. 7 is an explanatory diagram illustrating a state of fuel when the vehicle body is inclined at a predetermined angle such that a front part of the vehicle body lowers.

With reference to FIG. 7, an explanatory diagram illustrating a state of the fuel 9 when the vehicle body 1 is inclined by a predetermined angle such that a front portion of the vehicle body 1 is lowered is illustrated.

When the vehicle body 1 is inclined by the predetermined angle such that a front portion of the vehicle body 1 is lowered, the fuel 9 is biased to be stored on the side separated from the first tank 32 of the second tank 34 and in the fuel holding member 52.

Specifically, the fuel 9 stored in the first tank 32 flows in a direction away from the first tank 32 of the second tank 34 via the piping member 33, the first tubular member 60 and the second tubular member 64 by gravity. On the other hand, the fuel holding member 52 prevents one part of the fuel 9 stored in the second tank 34 from flowing toward the side separated from the first tank 32 of the second tank 34, and the one part of the fuel is stored in the fuel holding member 52.

Consequently, the fuel tank unit 30 stores the fuel 9 in the fuel holding member 52 when the vehicle body 1 is inclined by the predetermined angle such that the front portion of the vehicle body 1 is lowered, so that the fuel 9 can be supplied from the sucking-out part 49 to the engine 12 via the filter device 46 and the pump 48.

Figure 8:
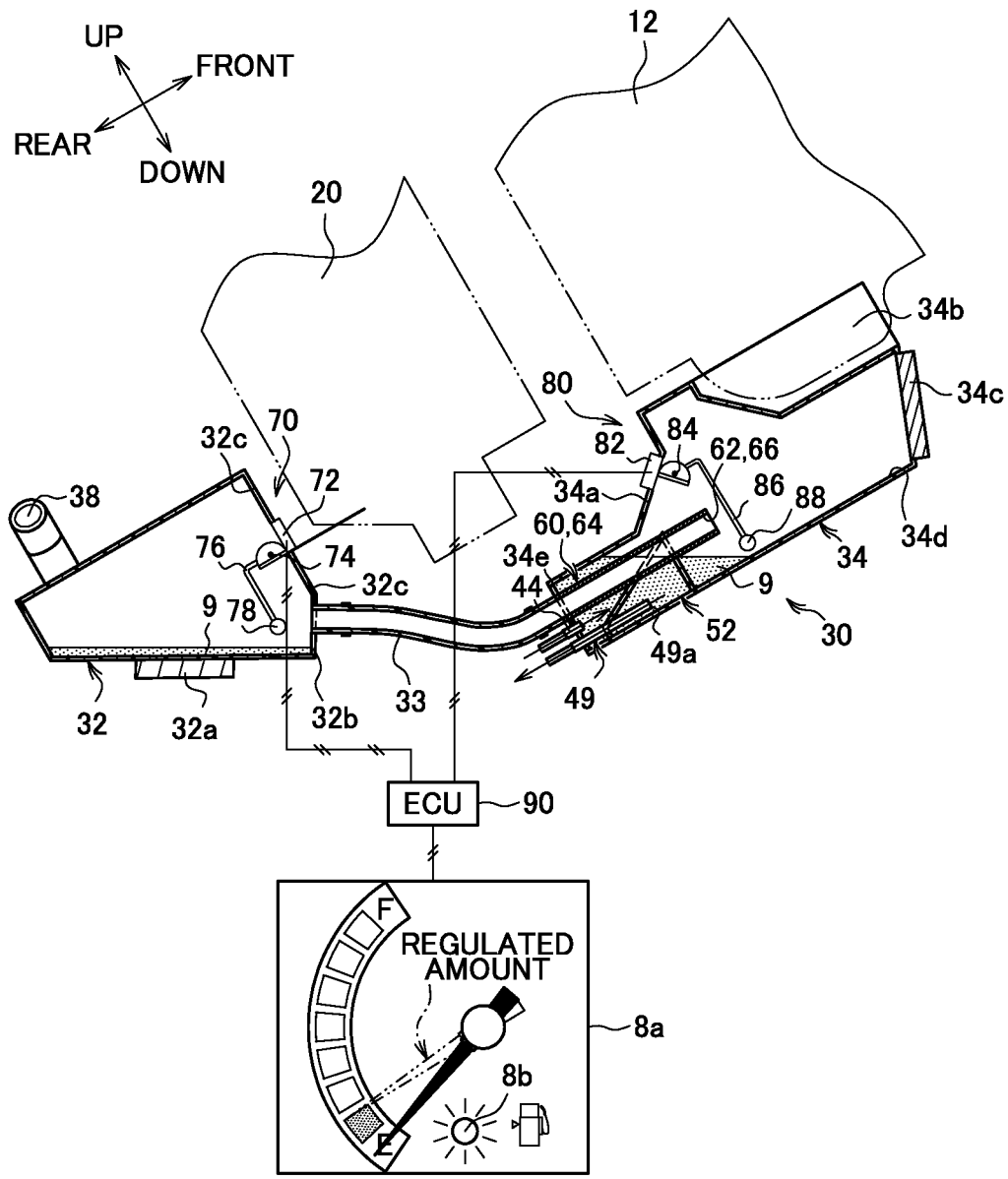
FIG. 8 is an explanatory diagram illustrating a state of fuel when the vehicle body is inclined at a predetermined angle such that the front part of the vehicle body rises.

Referring to FIG. 8, an explanatory diagram illustrating a state of the fuel 9 when the vehicle body 1 is inclined at a predetermined angle such that the front part of the vehicle body 1 rises is illustrated.

When the vehicle body 1 is inclined at the predetermined angle such that the front part of the vehicle body 1 rises, the fuel 9 is biased to be stored near the lower surface 32b of the first tank 32, and on the side close to the first tank 32 of the second tank 34.

More specifically, the fuel 9 stored in the second tank 34 flows toward the first tank 32 through the first tubular member 60, the second tubular members 64, and the first pipe 33a and the second pipes 33b of the piping member 33 by gravity. At this time, the first tubular member 60 and the second tubular members 64 extend toward the front side of the vehicle body 1 from the rear end surface 34e, and the opening 62 and the openings 66 are provided at positions further separated from the first tank than the opening 49a of the sucking-out part 49, so that the fuel 9 below the opening 62 and the openings 66 as viewed in the gravity direction, out of the fuel 9 stored in the second tank 34, is biased to be stored on the side close to the first tank 32 of the second tank 34 without flowing in the first tank 32.

Thus, in the fuel tank unit 30, the first tubular member 60 and the second tubular members 64 extend toward the front side of the vehicle body 1 from the rear end surface 34e, so that when the vehicle body 1 is inclined at the predetermined angle such that the front part of the vehicle body 1 rises, the fuel 9 can be stored on the side of the first tank 32 of the second tank 34, and therefore it is possible to supply the fuel 9 from the sucking-out part 49 to the engine 12 through the filter device 46 and the pump 48.

The first end of the fourth tube 44 is connected to the second tank 34 from the rear end surface 34e, so that the fuel 9 that is not used for combustion in the engine 12 and remains returns to the second tank 34 through the fourth tube 44, and therefore even when the vehicle body 1 is inclined at the predetermined angle such that the front part of the vehicle body 1 rises, it is possible to store the fuel 9 on the side of the first tank 32 of the second tank 34.

With such a configuration, even in any of the state in which the vehicle body 1 is disposed on the flat ground, the state in which the vehicle body 1 is inclined at the predetermined angle such that the front part lowers, and the state in which the vehicle body 1 is inclined at the predetermined angle such that the front part rises, the fuel tank unit 30 can supply the fuel 9 to the engine 12.

Now, a method of calculating the storage amount of the fuel 9 in the fuel tank unit 30 using the first float sensor 70 and the second float sensor 80 will be described. Hereinafter, for convenience of explanation, the storage amount of the fuel 9 in the fuel tank unit 30 is referred to as a total storage amount S, the storage amount of the fuel 9 in the first tank 32, detected by the first float sensor 70 is referred to as a first storage amount A, and the storage amount of the fuel 9 in the second tank 34, detected by the second float sensor 80 is referred to as a second storage amount B. The total storage amount S when the fuel tank unit 30 is full is referred to as a maximum total storage amount Smax, the first storage amount A when the first tank 32 is full is referred to as a maximum first storage amount Amax, and the second storage amount B when the second tank 34 is full is referred to as a maximum second storage amount Bmax. Herein, it is assumed that the maximum first storage amount Amax and the maximum second storage amount Bmax are the same storage amount.

As illustrated in FIGS. 5 and 6, the total storage amount S is calculated by adding the second storage amount B to the first storage amount A.

Specifically, when the total storage amount S is an amount corresponding to 80% of the maximum total storage amount Smax, for example, the first storage amount A is an amount corresponding to 60% of the maximum first storage amount Amax, and the second storage amount B is equal to the maximum second storage amount Bmax (FIG. 5).

On the other hand, when the total storage amount S is an amount corresponding to 20% of the maximum total storage amount Smax, for example, a numerical value of the first storage amount A is 0, and the second storage amount B is an amount corresponding to 40% of the maximum second storage amount Bmax (FIG. 6).

Thus, when the disposed positions of the first tank 32 and the second tank 34 are different in the vehicle body vertical direction, the respective storage rates of the first storage amount A and the second storage amount B to the maximum first storage amount Amax and the maximum second storage amount Bmax are different. Therefore, the total storage amount S can be accurately calculated by adding the second storage amount B to the first storage amount A to calculate the total storage amount S.

The total storage amount S thus calculated is displayed on the fuel meter 8a of the operation panel 8 as needed, so that the operator can operate the vehicle body 1 while visually recognizing the total storage amount S. When the total storage amount S is less than a regulated amount (for example, 10% of the maximum total storage amount Smax), for example, the warning light 8b provided on the fuel meter 8a of the operation panel 8 is turned on, so that the operator can be warned that the total storage amount S is less than the regulated amount.

As illustrated in FIGS. 7 and 8, when the total storage amount S is less than the regulated amount and the vehicle body 1 is inclined by the predetermined angle such that the front portion of the vehicle body 1 is lowered or raised, both respective numerical values of the first storage amount A and the second storage amount B detected by the first float sensor 70 and the second float sensor 80 are sometimes calculated as 0.

However, when the vehicle body 1 is inclined by the predetermined angle such that the front portion of the vehicle body 1 is lowered, the actual storage amount of the fuel 9 in the first tank 32 is the amount of the fuel 9 stored in the fuel holding member 52. Further, the actual storage amount of the fuel 9 in the first tank 32 when the vehicle body 1 is inclined by the predetermined angle such that the front portion of the vehicle body 1 is raised is the amount of the fuel 9 stored below the opening 62 of the first tubular member 60 and the opening 66 of the second tubular member 64.

Therefore, even in a case where the total storage amount S calculated when the vehicle body 1 is located on a flat ground is less than the regulated amount, when the vehicle body 1 is inclined, and the numerical value of the first storage amount A detected by the first float sensor 70 is 0, it is determined that the vehicle body 1 is inclined by the predetermined angle or more, and for example, the warning light 8b provided on the fuel meter 8a of the operation panel 8 is flashed and displayed. Consequently, the operator recognizes that the vehicle body 1 can be operated only by the total storage amount S of the fuel 9 stored in the fuel holding member 52 and below the opening 62 of the first tubular member 60 and the opening 66 of the second tubular member 64, and then can recognize that refueling work of the vehicle body 1 is necessary.

As described above, in the work vehicle according to the present invention, the work vehicle including the drive device 10 having the engine 12 for driving the vehicle body 1 has: the first tank 32 that is disposed in front of or behind the drive device 10, and stores the fuel 9 to be supplied to the engine 12; the second tank 34 that is disposed below the drive device 10 so as to be separated from the first tank 32 by the predetermined distance, and stores the fuel 9 to be supplied to the engine 12; the first float sensor 70 that is disposed in the first tank 32, and detects the amount of the fuel 9 stored in the first tank 32; and the second float sensor 80 that is disposed in the second tank 34, and detects the amount of the fuel 9 stored in the second tank 34.

Therefore, the first float sensor 70 and the second float sensor 80 are provided in the first tank 32 and the second tank 34, respectively, so that it is possible to detect the storage amount of the fuel 9 in each of the first tank 32 and the second tank 34.

The first float sensor 70 detects the amount of the fuel 9 stored in the first tank 32 on the basis of the position of the liquid surface of the fuel 9 at the vehicle body right-left direction center of the first tank 32, and the second float sensor 80 detects the amount of the fuel 9 stored in the second tank 34 on the basis of the position of the liquid surface of the fuel 9 at the vehicle body right-left direction center of the second tank 34.

Therefore, the amount of the fuel 9 stored in the first tank 32 and the amount of the fuel 9 stored in the second tank 34 are detected on the basis of the respective positions of the liquid surfaces of the fuel 9 at the vehicle body right-left direction centers of the first tank 32 and the second tank 34, respectively, so that it is possible to detect the amount of the fuel 9 stored in each of the first tank 32 and the second tank 34 even in a case where the vehicle body 1 inclines left and right.

The total amount (total storage amount S) of the fuel 9 stored in the first tank 32 and the second tank 34 is calculated by adding the amount(second storage amount B) of the fuel 9 stored in the second tank 34, detected by the second float sensor 80 to the amount (first storage amount A) of the fuel 9 stored in the first tank 32, detected by the first float sensor 70, so that the total storage amount S can be calculated accurately.

The first tank 32 includes the oil filling port 38 for replenishing the fuel 9 to the first tank 32, and the float 78 of the first float sensor 70 is located at the position separated by at least the first distance L1 from the path for allowing the fuel 9 replenished from the oil filling port 38 to flow into the first tank 32, so that it is possible to suppress direct falling of the fuel 9 replenished from the oil filling port 38 to the first tank 32 on the float 78 of the first float sensor 70.

The second tank 34 includes the first tubular member 60 and the second tubular member 64 for replenishing the fuel 9 to the second tank 34, and the float 88 of the second float sensor 80 is located at the position separated by at least the second distance L2 from the path for allowing the fuel 9 replenished from the first tubular member 60 and the second tubular member 64 to flow into the second tank 34, and therefore it is possible to suppress direct falling of the fuel 9 replenished from the first tubular member 60 and the second tubular member 64 to the second tank 34 on the float 88 of the second float sensor 80.

That is, the fuel 9 that vigorously flows and is replenished to the first tank 32 and the second tank 34 is prevented from directly falling on the float 78 of the first float sensor 70 and the float 88 of the second float sensor 80, so that it is possible to suppress breakdown of the floats 78, 88 due to the vigorously flowing fuel 9.

The first float sensor 70 is disposed on a surface facing the drive device 10 of the first tank 32, and the second float sensor 80 is disposed on a surface facing the drive device 10 of the second tank 34, and therefore the first float sensor 70 and the second float sensor 80 are surrounded by the first tank 32, the second tank 34, and the drive device 10, and for example, it is possible to suppress deterioration due to an external factor such as gravel.

The first float sensor 70 and the second float sensor 80 are float sensors are float sensors in which loci of the floats 78 and 88 by vertical rotation of the arms 76 and 86 include respective vehicle body front-rear direction centers of the first tank 32 and the second tank 34, and therefore even in a case where the vehicle body is inclined in the front-rear direction, it is possible to detect the storage amount of the fuel 9 at the vehicle body front-rear direction substantial center in each of the first tank 32 and the second tank 34 with a simple configuration.

The description of the work vehicle related to the present invention is thus completed, but the present invention is not limited to the above embodiment and can be changed without departing from the gist of the invention.

For example, in the present embodiment, the total storage amount S is calculated by adding the second storage amount B to the first storage amount A, and the calculated value is displayed on the fuel meter 8a. However, two fuel meters may be provided and the first storage amount A and the second storage amount B may be displayed on the respective fuel meters.

In this embodiment, the sucking-out part 49 is provided in the second tank 34, and the fuel 9 is sucked out only from the second tank 34. However, a sucking-out part may be similarly provided also in the first tank 32, and suck out the fuel 9 also from the first tank 32.

In this embodiment, the piping member 33 includes the first pipe 33a and the second pipes 33b. However, the number of pipes composing the piping member 33 may be one, or may be three or more.

In this embodiment, the oil filling port 38 is provided in the upper part of the first tank 32, but may be provided in an upper part of the second tank 34. In this case, an upper end of the oil filling port 38 is desirably located above an upper end of the first tank 32.

According to a work vehicle according to a first embodiment of the present invention, a work vehicle including a drive device having an internal combustion engine for driving a vehicle body has: a first tank that is disposed in front of or behind the drive device, and stores fuel to be supplied to the internal combustion engine; a second tank that is disposed below the drive device so as to be separated from the first tank by a predetermined distance, and stores fuel to be supplied to the internal combustion engine; a first storage amount detection part that is disposed in the first tank, and detects an amount of the fuel stored in the first tank; and a second storage amount detection part that is disposed in the second tank, and detects an amount of the fuel stored in the second tank.

In the first embodiment of the present invention, the first storage amount detection part and the second storage amount detection part are provided in the first tank and the second tank, respectively, so that it is possible to detect the storage amount of the fuel in each of the first tank and the second tank.

In a work vehicle according to a second embodiment of the present invention, the first storage amount detection part can detect the amount of the fuel stored in the first tank on the basis of a position of a liquid surface of the fuel at a vehicle body right-left direction center of the first tank, and the second storage amount detection part can detect the amount of the fuel stored in the second tank on the basis of a position of a liquid surface of the fuel at a vehicle body right-left direction center of the second tank.

In the second embodiment of the present invention, the amount of the fuel stored in the first tank and the amount of the fuel stored in the second tank are detected on the basis of the respective positions of the liquid surfaces of the fuel at the vehicle body right-left direction centers of the first tank and the second tank, respectively, so that it is possible to detect the amount of the fuel in each of the first tank and the second tank even in a case where the vehicle body inclines in the right-left direction.

In a work vehicle according to a third embodiment of the present invention, a total amount of the fuel stored in the first tank and the fuel stored in the second tank can be calculated by adding the amount of the fuel stored in the second tank and detected by the second storage amount detection part to the amount of the fuel stored in the first tank and detected by the first storage amount detection part.

In the third embodiment of the present invention, the value detected by the second storage amount detection part is added to the value detected by the first storage amount detection part to obtain the total amount of the fuel stored in the first tank and the second tank. The total amount of the fuel stored in the first tank and the second tank can be calculated accurately.

In a work vehicle according to a fourth embodiment of the present invention, the first tank includes a first replenishing port for replenishing the fuel to the first tank, and the first storage amount detection part can be located at a position separated by at least a first distance from a path for allowing the fuel replenished from the first replenishing port to flow into the first tank.

In the fourth embodiment of the present invention, the first storage amount detection part is located at the position separated by at least the first distance from the path for allowing the fuel replenished from the first replenishing port to the first tank to flow into the first tank, so that it is possible to suppress direct falling of the fuel replenished from the first replenishing port to the first tank on the first storage amount detection part.

In a work vehicle according to a fifth embodiment of the present invention, the second tank can include a second replenishing port for replenishing the fuel to the second tank, and the second storage amount detection part can be located at a position separated by at least a second distance from a path for allowing the fuel replenished from the second replenishing port to flow into the second tank.

In the fifth embodiment of the present invention, the second storage amount detection part is located at the position separated by at least the second distance from the path for allowing the fuel replenished from the second replenishing port to the second tank to flow into the second tank, so that it is possible to suppress direct falling of the fuel replenished from the second replenishing port to the second tank on the second storage amount detection part.

In a work vehicle according to a sixth embodiment of the present invention, the first storage amount detection part can be disposed on a surface facing the drive device of the first tank, and the second storage amount detection part can be disposed on a surface facing the drive device of the second tank.

In the sixth embodiment of the present invention, the first storage amount detection part and the second storage amount detection part are disposed on the respective surfaces facing the drive device of the first tank and the second tank, so that the first storage amount detection part and the second storage amount detection part are surrounded by the first tank, the second tank and the drive device, and therefore it is possible to suppress deterioration due to an external factor such as gravel.

In a work vehicle according to a seventh embodiment of the present invention, a float sensor can be used for each of the first storage amount detection part and the second storage amount detection part.

In the seventh embodiment of the present invention, the float sensors are used as the first storage amount detection part and the second storage amount detection part, so that it is possible to detect the storage amount of the fuel in each of the first tank and the second tank with a simple configuration.

EXPLANATION OF REFERENCE SIGNS 1 vehicle body
9 fuel
drive device
12 engine (internal combustion engine)
32 first tank
34 second tank
38 oil filling port (first replenishing port)
60 first tubular member (second replenishing port)
64 second tubular member (second replenishing port)
70 first float sensor (first storage amount detection part)
80 second float sensor (second storage amount detection part)

The invention claimed is:

1. A rolling machine including a drive device having an internal combustion engine for driving a vehicle body, the rolling machine comprising:
  a first tank that is disposed in front of or behind the drive device, and stores fuel to be supplied to the internal combustion engine;
  a second tank that is disposed below the drive device so as to be separated from the first tank by a predetermined distance, and stores fuel to be supplied to the internal combustion engine;
  a first storage amount detection part that is disposed in the first tank, and detects an amount of the fuel stored in the first tank; and
  a second storage amount detection part that is disposed in the second tank, and detects an amount of the fuel stored in the second tank, wherein
  the first storage amount detection part detects the amount of the fuel stored in the first tank on the basis of a position of a liquid surface of the fuel at a vehicle body right-left direction center of the first tank, and
  the second storage amount detection part detects the amount of the fuel stored in the second tank on the basis of a position of a liquid surface of the fuel at a vehicle body right-left direction center of the second tank,
  the first storage amount detection part and the second storage amount detection part are float sensors in which arms vertically rotate with rotating shafts as axes, loci of floats include respective vehicle body front-rear direction centers of the first tank and the second tank,
  the rotating shafts each extend in the vehicle body right-left direction,
  the first storage amount detection part is disposed on a surface facing the drive device of the first tank, and
  the second storage amount detection part is disposed on a surface facing the drive device of the second tank.

2. The rolling machine according to claim 1, wherein a total amount of the fuel stored in the first tank and the fuel stored in the second tank is calculated by adding the amount of the fuel stored in the second tank and detected by the second storage amount detection part to the amount of the fuel stored in the first tank and detected by the first storage amount detection part.

3. The rolling machine according to claim 1, wherein
the first tank includes a first replenishing port for replenishing the fuel to the first tank, and
the first storage amount detection part is located at a position separated by at least a first distance from a path for allowing the fuel replenished from the first replenishing port to flow into the first tank.

4. The rolling machine according to claim 1, wherein
the second tank includes a second replenishing port for replenishing the fuel to the second tank, and
the second storage amount detection part is located at a position separated by at least a second distance from a path for allowing the fuel replenished from the second replenishing port to flow into the second tank.

* * * * *